United States Patent
Hung

(10) Patent No.: US 8,245,991 B2
(45) Date of Patent: Aug. 21, 2012

(54) SUPPORTING ARM

(75) Inventor: Chin-Jui Hung, Wu-Chi Chen (TW)

(73) Assignee: Modernsolid Industrial Co., Ltd., Wu-Chi Chen, Taichung Hsien (TW)

( * ) Notice: Subject to any disclaimer, the term of this patent is extended or adjusted under 35 U.S.C. 154(b) by 231 days.

(21) Appl. No.: 12/804,196

(22) Filed: Jul. 16, 2010

(65) Prior Publication Data
US 2012/0012722 A1   Jan. 19, 2012

(51) Int. Cl.
*E04G 3/00* (2006.01)
(52) U.S. Cl. ........... 248/276.1; 248/289.31; 248/292.13; 248/921; 248/923
(58) Field of Classification Search ............ 248/274.1, 248/276.1, 278.1, 288.11, 289.31, 292.13, 248/917, 919, 921–923; 361/679.07
See application file for complete search history.

(56) References Cited

U.S. PATENT DOCUMENTS

| | | | | |
|---|---|---|---|---|
| 2,898,066 A * | 8/1959 | Ouellette | ...................... | 248/145 |
| 5,876,008 A * | 3/1999 | Sweere et al. | ................ | 248/325 |
| 5,975,472 A * | 11/1999 | Hung | ......................... | 248/278.1 |
| 6,752,363 B2 * | 6/2004 | Boele | ......................... | 248/183.1 |
| 6,983,917 B2 * | 1/2006 | Oddsen, Jr. | ................. | 248/274.1 |
| 7,048,242 B2 * | 5/2006 | Oddsen, Jr. | ............. | 248/280.11 |
| 7,207,537 B2 * | 4/2007 | Hung | ......................... | 248/284.1 |
| 7,338,022 B2 * | 3/2008 | Hung | ......................... | 248/278.1 |
| 7,458,549 B2 * | 12/2008 | Oddsen, Jr. | ............. | 248/280.11 |
| 7,472,458 B2 * | 1/2009 | Oddsen, Jr. | ..................... | 16/255 |
| 7,866,618 B2 * | 1/2011 | Grabania et al. | .......... | 248/274.1 |
| 2005/0121577 A1 * | 6/2005 | Oddsen et al. | .......... | 248/225.11 |
| 2010/0200717 A1 * | 8/2010 | Oddsen et al. | ............ | 248/274.1 |

* cited by examiner

*Primary Examiner* — Bradley Duckworth
(74) *Attorney, Agent, or Firm* — Charles E. Baxley

(57) ABSTRACT

A supporting arm has a mounting seat, a buffering device and a body. The mounting seat is mounted on a table or a wall and has a mounting jacket and a top board. The mounting jacket has a through hole and an abutting face. The top board is detachably connected to the mounting jacket and has a mounting end and a connecting end. The buffering device is connected to the mounting seat and has at least one buffering shaft and a connecting frame. The at least one buffering shaft is pivotally connected to the connecting end of the top board. The connecting frame is pivotally connected to the at least one buffering shaft and abuts the mounting jacket. The body is connected to the buffering device through the mounting seat and has a pivotal end, a pivotal rod and an extending end.

12 Claims, 5 Drawing Sheets

SUPPORTING ARM

BACKGROUND OF THE INVENTION

1. Field of the Invention

The present invention relates to a supporting arm, and more particularly relates to a supporting arm for suspending a monitor that can provide a buffering effect to users.

2. Description of Related Art

With reference to FIG. 5, a conventional supporting arm 50 is used to suspend a monitor securely on a table or a wall and has a mounting end 51 and a connecting end 52. The mounting end 51 of the conventional supporting arm 50 has a mounting jacket 511 to mount around a holding post that is mounted securely on a table or a wall. The connecting end 52 of the conventional supporting arm 50 is connected to an extending arm 60 to increase the moving scope of the monitor.

The conventional supporting arm 50 can be used to suspend the monitor securely on the table or the wall, and the connecting end 51 of the conventional supporting arm 50 is securely mounted on the table or the wall. When a user, especially in the medical institution, may hold and press on the conventional supporting arm 50 to go to bed or leave the bed or may hang an article on the conventional supporting arm 50. When the conventional supporting arm has been used after a long time and can not to bear the external force or the weight of the article, the conventional supporting arm 50 may be separated from the table or the wall or may be broken and the life of the conventional supporting arm 50 will be shortening and may get the user hurt.

Therefore, the present invention provides a supporting arm to mitigate or obviate the aforementioned problems.

SUMMARY OF THE INVENTION

The main objective of the present invention is to provide a supporting arm for suspending a monitor that can provide a buffering effect to users.

The supporting arm in accordance with the present invention has a mounting seat, a buffering device and a body. The mounting seat is mounted on a table or a wall and has a mounting jacket and a top board. The mounting jacket has a through hole and an abutting face. The top board is detachably connected to the mounting jacket and has a mounting end and a connecting end. The buffering device is connected to the mounting seat and has at least one buffering shaft and a connecting frame. The at least one buffering shaft is pivotally connected to the connecting end of the top board. The connecting frame is pivotally connected to the at least one buffering shaft and abuts the mounting jacket. The body is connected to the buffering device through the mounting seat and has a pivotal end, a pivotal rod and an extending end.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
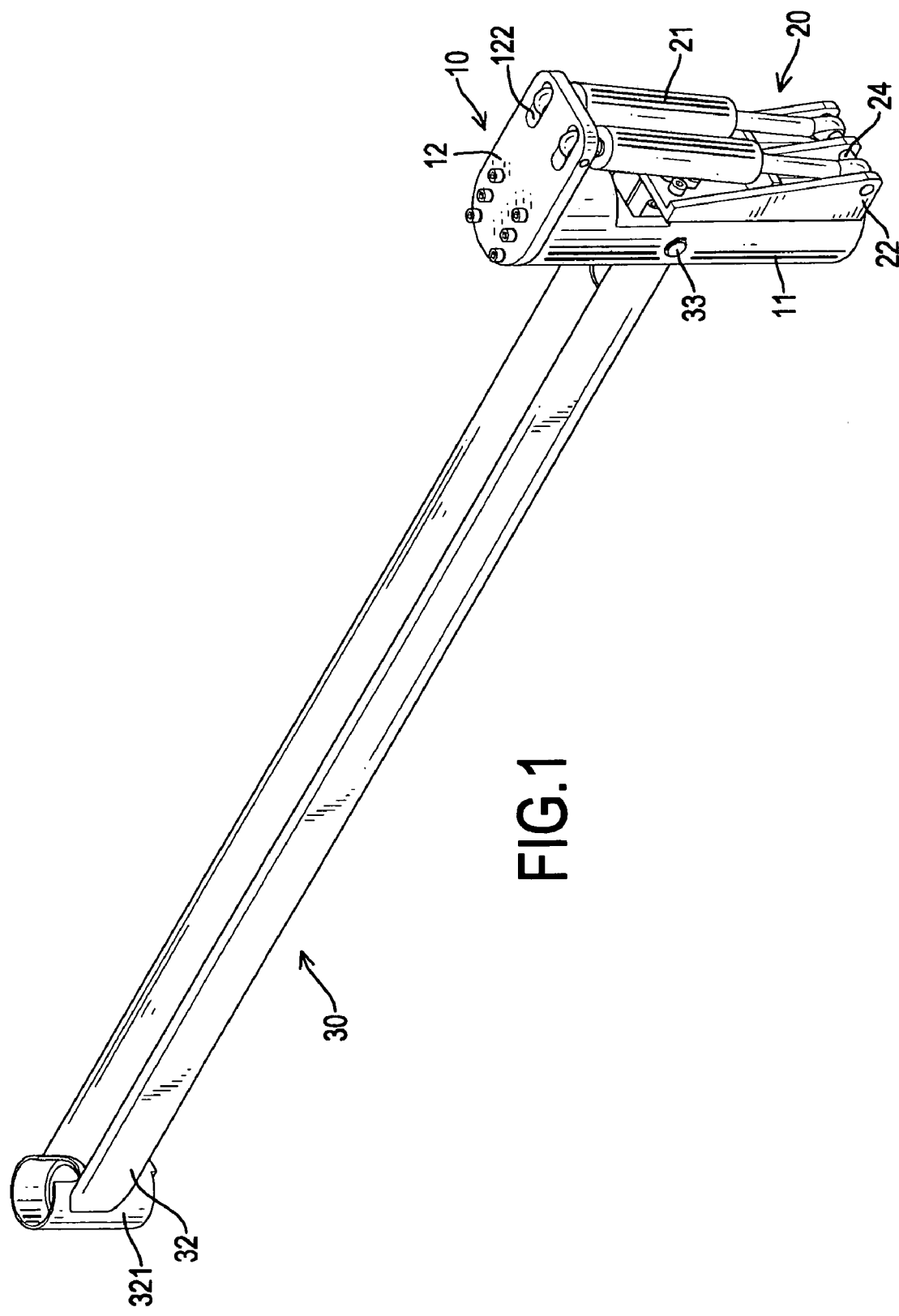
FIG. 1 is a perspective view of a supporting arm in accordance with the present invention.
Figure 2:
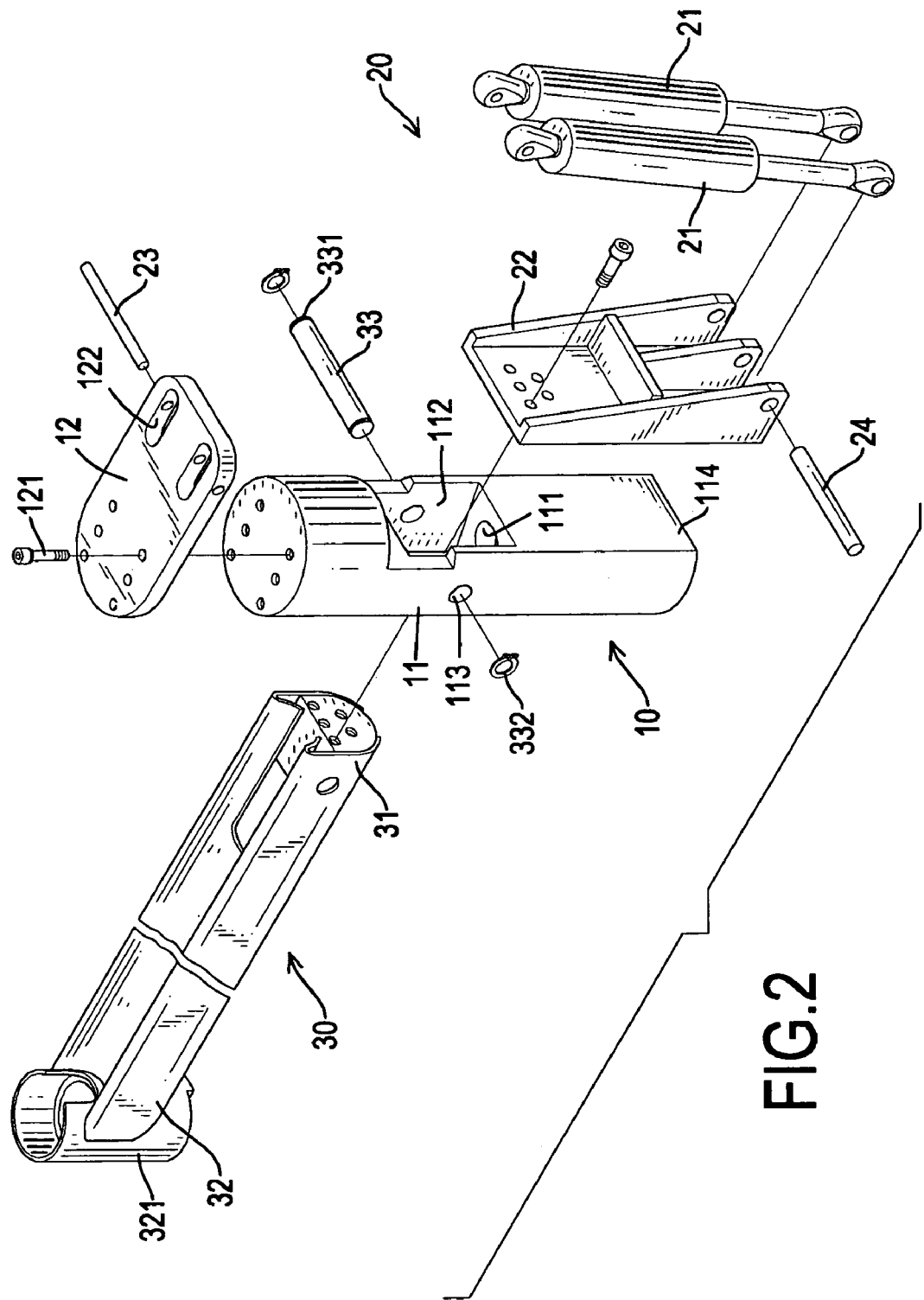
FIG. 2 is an enlarged exploded perspective view of the supporting arm in FIG. 1.
Figure 3:
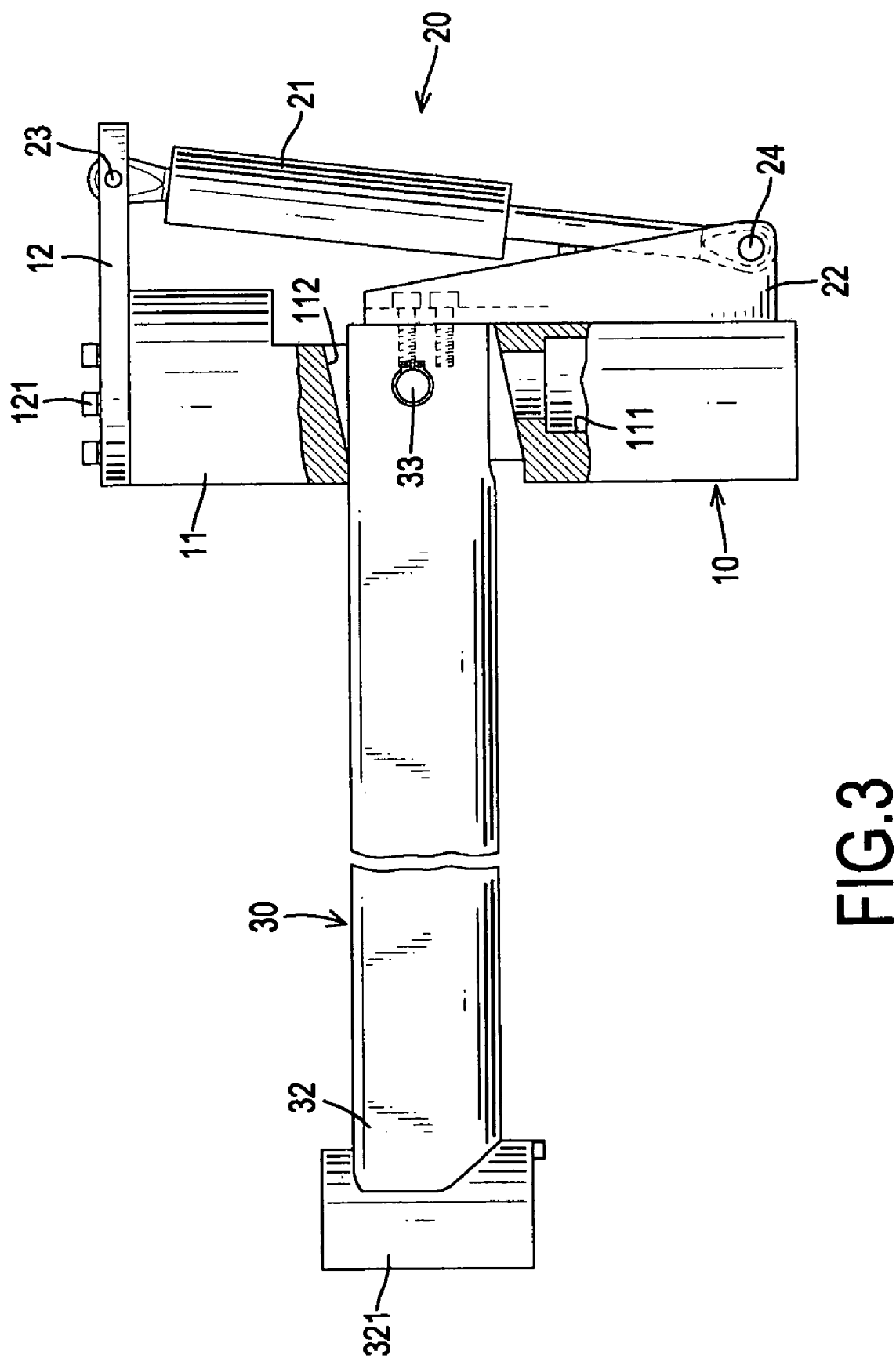
FIG. 3 is an enlarged side view in partial section of the supporting arm in FIG. 1.

With reference to FIGS. 1 to 3, a supporting arm in accordance with the present invention has a mounting seat 10, a buffering device 20 and a body 30.

The mounting seat 10 is used to mount on a table or a wall and has a mounting jacket 11 and a top board 12.

The mounting jacket 11 is mounted around a mounting post that is mounted securely on a table or a wall and has a bottom, a top, a middle, an external surface, a rear side, a through hole 112, a mounting hole 111, two pivotal holes 113 and an abutting face 114. The through hole 112 is formed through the middle of the mounting jacket 11. The mounting hole 111 is formed through the bottom of the mounting jacket 11, is mounted around the mounting post that is mounted securely on the table or the wall and communicates with the through hole 112 of the mounting jacket 11. The pivotal holes 113 are formed through the external surface of the mounting jacket 11, align with each other and communicates with the through hole 112 of the mounting jacket 11. The abutting face 114 is flatly formed on the rear side of the mounting jacket 11 between the middle and the bottom of the mounting jacket 11.

The top board 12 is detachably connected to the mounting jacket 11 and has a mounting end, a connecting end, a multiple fasteners 121 and two elongated holes 122. The mounting end of the top board 12 is mounted on the top of the mounting jacket 11. The connecting end of the top board 12 extends out of the top of the mounting jacket 11. The fasteners 121 are mounted through the mounting end of the top board 12 and are connected securely to the top of the mounting jacket 11 to hold the top board 12 securely with the mounting jacket 11. The elongated holes 122 are formed through the connecting end of the top board 12 at an interval.

The buffering device 20 is connected to the mounting seat 10 and has at least one buffering shaft 21 and a connecting frame 22.

The at least one buffering shaft 21 is pivotally connected to the connecting end of the top board 12 and has an upper end and a lower end. The upper end of the at least one buffering shaft 21 is pivotally connected to connecting end of the top board 12. Preferably, the buffering device 20 has two buffering shafts 21 respectively mounted in the elongated holes 122 of the top board 12 and a connecting rod 23 mounted through the upper ends of the buffering shafts 21 and the elongated holes 122 of the top board 12 to connect the buffering shafts 21 with the top board 12.

The connecting frame 22 may be trapezoidal, is pivotally connected to the at least one buffering shaft 21 and abuts the mounting jacket 11 and has a front side, a top end, a bottom end and a linking rod 24. The front side of the connecting frame 22 abuts the abutting face 114 of the mounting jacket 11. The top end of the connecting frame 22 faces to the though hole 112 of the mounting jacket 11. The connecting frame 22 is pivotally connected to the at least one buffering shaft 21 near the bottom end. The linking rod 24 is mounted through the connecting frame 22 near the bottom end opposite to the front side of the connecting frame 22 and is pivotally connected to the lower end of the at least one buffering shaft 21.

The body 30 is connected to the buffering device 20 through the mounting seat 10 and has an external surface, two sides, a pivotal end 31, a pivotal rod 33 and an extending end 32.

The pivotal end 31 of the body 30 extends through the through hole 112 of the mounting jacket 11, is pivotally connected to the mounting jacket 11 and is securely connected to the connecting frame 22 near the top end by multiple bolts to allow the external surface of the body 30 abutting the mounting jacket 11 in the through hole 112.

The pivotal rod 33 is mounted in the pivotal holes 113 of the mounting jacket 11, is pivotally connected to pivotal end 31 of the body 30 and has an outer surface, two ends, two annular grooves 331 and two holding rings 332. The ends of the pivotal rod 33 respectively extend out of the pivotal holes 113 of the mounting jacket 11. The annular grooves 331 are respectively formed around the outer surface of the pivotal rod 33 near the ends of the pivotal rod 33. The holding rings 332 are respectively mounted in the annular grooves 331 and abut the external surface of the mounting jacket 11 to hold the pivotal rod 33 with the mounting jacket 11.

The extending end 32 of the body 30 is formed with the pivotal end 31 and has a connecting tube 321 to connect with an extending arm.

Figure 4:
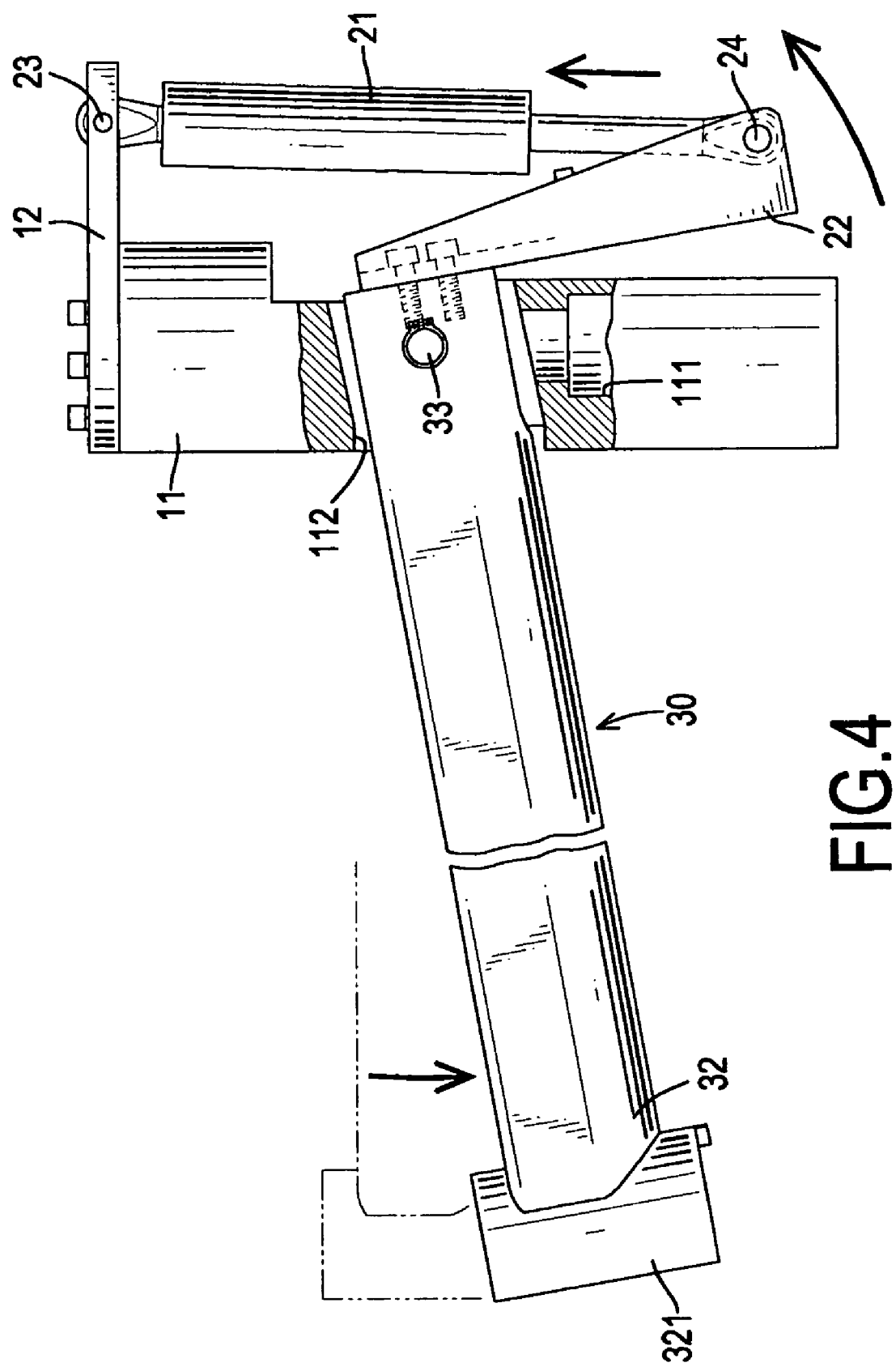
FIG. 4 is an operational side view in partial section of the supporting arm in FIG. 1.
Figure 5:
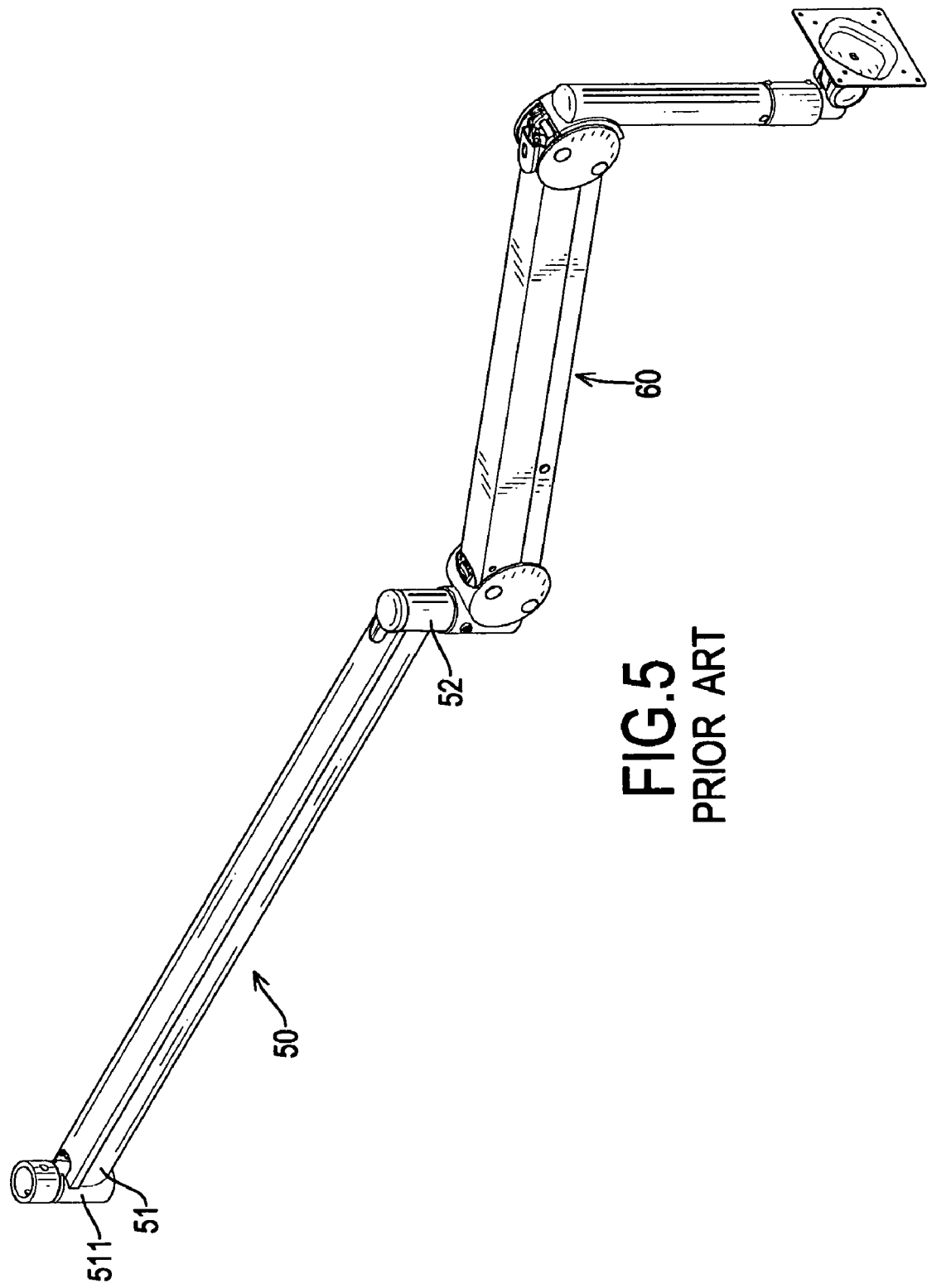
FIG. 5 is a perspective view of a supporting arm in accordance with the prior art.

With reference to FIG. 4, when an external force is acted or a heavy article is mounted on the body 30 of the supporting arm in accordance with the present invention near the extending end 32 and the body 30 can not bear the external force or the weight of the article, the extending end 32 of the body 30 will rotated relative to the mounting jacket 11 of the mounting seat 10. Then, the connecting frame 22 will move with the pivotal end 31 of the body 30 to allow the front side of the connecting frame 22 separating from the abutting face 114 of the mounting jacket 11 to press the at least one buffering shaft 21. Therefore, each of the at least one buffering shaft can provide a buffering effect to the supporting arm when the body 30 can not bear the external force or the weight of the article to prevent the supporting arm separating from the table or the wall, and this is safe in used.

In addition, the pivotal body 30 of the supporting arm also can be used to prevent the users pressing on the body 30 when goes to bed or leaves the bed, and the life of the supporting arm in accordance with the present invention will be longer than a conventional supporting arm without the buffering device 20.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A supporting arm comprising
a mounting seat being adapted to mount on a wall and having
a mounting jacket having
a bottom;
a top;
a middle;
an external surface;
a rear side;
a through hole formed through the middle of the mounting jacket; and
an abutting face flatly formed on the rear side of the mounting jacket between the middle and the bottom of the mounting jacket; and
a top board detachably connected to the mounting jacket and having
a mounting end mounted on the top of the mounting jacket; and
a connecting end extending out of the top of the mounting jacket;
a buffering device connected to the mounting seat and having
at least one buffering shaft pivotally connected to the connecting end of the top board and having
an upper end pivotally connected to connecting end of the top board; and
a lower end; and
a connecting frame pivotally connected to the at least one buffering shaft and abutting the mounting jacket and having
a front side abutting the abutting face of the mounting jacket;
a top end facing to the though hole of the mounting jacket; and
a bottom end, wherein the connecting frame pivotally connected to the at least one buffering shaft near the bottom end; and
a body connected to the buffering device through the mounting seat and having
an external surface;
two sides;
a pivotal end extending through the through hole of the mounting jacket, pivotally connected to the mounting jacket and securely connected to the connecting frame near the top end to allow the external surface of the body abutting the mounting jacket in the through hole;
a pivotal rod mounted in the mounting jacket and pivotally connected to pivotal end of the body; and
an extending end formed with the pivotal end.

2. The supporting arm as claimed in claim 1, wherein
the top board has two elongated holes formed through the connecting end of the top board at an interval;
the buffering device has
two buffering shafts respectively mounted in the elongated holes of the top board; and
a connecting rod mounted through the upper ends of the buffering shafts and the elongated holes of the top board to connect the buffering shafts with the top board.

3. The supporting arm as claimed in claim 2, wherein
the mounting jacket has two pivotal holes formed through the external surface of the mounting jacket, aligning with each other and communicating with the through hole of the mounting jacket; and
the pivotal rod is mounted in the pivotal holes of the mounting jacket.

4. The supporting arm as claimed in claim 3, wherein the pivotal rod has an outer surface;
two ends respectively extending out of the pivotal holes of the mounting jacket;
two annular grooves respectively formed around the outer surface of the pivotal rod near the ends of the pivotal rod; and
two holding rings respectively mounted in the annular grooves and abutting the external surface of the mounting jacket to hold the pivotal rod with the mounting jacket.

5. The supporting arm as claimed in claim 4, wherein the connecting frame has a linking rod mounted through the connecting frame near the bottom end opposite to the front side of the connecting frame and pivotally connected to the lower end of the at least one buffering shaft.

6. The supporting arm as claimed in claim 5, wherein the mounting jacket has a mounting hole formed through the bottom of the mounting jacket and communicating with the through hole of the mounting jacket.

7. The supporting arm as claimed in claim 6, wherein the extending end of the body has a connecting tube.

8. The supporting arm as claimed in claim 7, wherein the top board has multiple fasteners mounted through the mounting end of the top board and connected securely to the top of the mounting jacket to hold the top board securely with the mounting jacket.

9. The supporting arm as claimed in claim 1, wherein the connecting frame has a linking rod mounted through the connecting frame near the bottom end opposite to the front side of the connecting frame and pivotally connected to the lower end of the at least one buffering shaft.

10. The supporting arm as claimed in claim 1, wherein the mounting jacket has a mounting hole formed through the bottom of the mounting jacket and communicating with the through hole of the mounting jacket.

11. The supporting arm as claimed in claim 1, wherein the extending end of the body has a connecting tube.

12. The supporting arm as claimed in claim 1, wherein the top board has multiple fasteners mounted through the mounting end of the top board and connected securely to the top of the mounting jacket to hold the top board securely with the mounting jacket.

\* \* \* \* \*